United States Patent [19]

Ohya et al.

[11] Patent Number: 4,490,787
[45] Date of Patent: Dec. 25, 1984

[54] STO STACK CONTROL SYSTEM

[75] Inventors: Masayuki Ohya, Kawasaki, Japan; Masaaki Inou, Stockport, England

[73] Assignee: Fujitsu Limited, Kawasaki, Japan

[21] Appl. No.: 423,715

[22] Filed: Sep. 27, 1982

[30] Foreign Application Priority Data

Sep. 25, 1981 [JP] Japan .................... 56-152514

[51] Int. Cl.³ .............................................. G06F 9/00
[52] U.S. Cl. ................................................. 364/200
[58] Field of Search ..................... 364/200 MS File

[56] References Cited

U.S. PATENT DOCUMENTS

| | | | |
|---|---|---|---|
| 3,781,808 | 12/1973 | Ahearn et al. | 340/172.5 |
| 4,068,303 | 1/1978 | Morita | 364/200 |
| 4,326,248 | 4/1982 | Hinai et al. | 364/200 |
| 4,430,705 | 2/1984 | Cannavino et al. | 364/200 |

Primary Examiner—Raulfe B. Zache
Attorney, Agent, or Firm—Staas & Halsey

[57] ABSTRACT

A segment table origin (STO) stack control system employed in a data processing system which enables dynamic access over a plurality of virtual spaces, and in which the STO stack is retrieved depending upon the contents of a plurality of control registers which specify virtual spaces. In this system, when the contents of a given control register are changed to register a new STO data based on an STO identifier (STO-ID) in the STO stack and when it becomes necessary to erase the STO data of an old STO-ID due to the limited number of storage locations on the STO stack, the STO data corresponding to the old STO-ID is not erased when the registration thereof is effected on the basis of the virtual space that corresponds to the contents of other control register but, instead, the STO data corresponding to the old STO-ID registered on the basis of the space corresponding to the control register whose contents are changed, is erased.

14 Claims, 4 Drawing Figures

Fig. 2

| F | 0 | 1 | 2 | 3 | 4 | 5 | 6 |

Fig. 3

| F | V | H/C | CRI/CR7 |

Fig. 4

| CHG | CR1/CR7 FLAG | MATCH 1 | MATCH 7 | EXPELLED ID |
|---|---|---|---|---|
| CR1 | 0 | — | — | DEPEND ON H/C |
| | 1 | — | 0 | DEPEND ON H/C |
| | | — | 1 | EXPEL CR1 |
| CR7 | 0 | — | — | DEPEND ON H/C |
| | 1 | 0 | — | DEPEND ON H/C |
| | | 1 | — | EXPEL CR7 |

STO STACK CONTROL SYSTEM

BACKGROUND OF THE INVENTION (1) Field of the Invention

The present invention relates to a segment table origin address (STO) stack control system, and particularly to a STO stack control system employed in the data processing system which enables dynamic access over a plurality of virtual spaces, and in which the STO stack is retrieved depending upon the contents of a plurality of control registers which specify virtual spaces. In this system, when the contents of a given control register are changed to register new STO data having a new STO identifier (STO-ID) in the STO stack and when it becomes necessary to erase the STO data of an old Sto-ID due to a limitation on the number of storage positions on the STO stack, non-corresponding STO data having an old STO-ID is not erased where the registration thereof is was performed on a basis of the virtual space that corresponds to the content of another control register but, instead, the STO data corresponding to the old STO-ID registered on the basis of the virtual space corresponding to the control register whose contents are changed, is erased.

(2) Description of the Prior Art

In a conventional data processing system which employs a multi-virtual memory system dealing with multiple virtual spaces, it is accepted practice to register STO-ID's corresponding to virtual spaces in the STO stack, to retrieve the STO stack when a virtual space is changed, and to supply the retrieved STO-ID to a table lookaside buffer (TLB) so that the STO-ID is stored in the TLB together with the data that designates correspondence between a real address and a virtual address.

However, in a data processing system which enables access over, for example, two virtual spaces or, in other words, in a data processing system which is based upon a so-called great virtual memory system which couples two virtual spaces having definite maximum sizes into one big virtual space, two control registers are provided to make access to the STO stack, and the STO stack is retrieved depending upon the contents of each of the control registers.

In registering the STO-ID, on the other hand, the STO-ID's are generated by hashing the contents of the control registers. Therefore, some of the generated STO-ID's may assume the same value despite the fact that the control registers actually have different contents. Therefore, the STO stack is divided into two ways, or portions, i.e., up side and down side, so that two STO-ID's which have the same value are extractably or identifiably registered onto the STO stack, and when it is necessary to register a new STO-ID that assumes the same value as the registered ones, the older one is erased from the two existing STO-ID's. Below, the registered STO-ID which is utilized most recently is called a hot STO-ID and the other one is called a cold STO-ID.

The above-mentioned erasure processing has heretofore been put into practice. In a data processing apparatus in which access over two virtual spaces is permitted, however, when the contents of a given one of the two control registers are changed to register a new STO-ID, the old STO-ID on the cold side (i.e., the one that will be erased) may often happen to be a STO-ID that is generated on the basis of the contents of the other of the two control registers. Even in such a case, the conventional system erases the registration (i.e., the STO data) of the STO-ID on the cold side, i.e., the data having the STO-ID corresponding to the other of the two control registers. Therefore, access over two virtual spaces, i.e., over a virtual space designated by the contents of the given one of the control registers and a virtual space designated by the contents of the other control register, is greatly limited. This is because, since most of the dynamic access over different virtual spaces is effected over virtual spaces which are recently used, it is not preferable, in the above-mentioned case, to erase the STO-ID on the cold side. Moreover, in the conventional data processing system, access over different spaces is effected by using a common area which temporarily stores the contents of a virtual space. Therefore, the processing ability of the conventional system is greatly decreased especially when the access over different virtual spaces is effected.

SUMMARY OF THE INVENTION

It is, therefore, an object of the present invention to enable dynamic access between a plurality of virtual spaces in a data processing system which employs a multi-virtual memory system.

It is another object of the present invention to prevent the decrease in the processing ability of a data processing system even when the dynamic access over a plurality of virtual spaces is effected.

According to the present invention, an STO stack control system is provided which comprises an STO stack that registers STO data based on STO-ID's generated on the basis of the hashed results of input data designating virtual spaces. In the system the STO stack is retrieved when the input data is changed, the STO-ID generated by using the STO stack is transferred to a TLB when the data corresponding to the STO-ID has already been registered in the STO stack, a new STO-ID is formed when the STO data corresponding to the STO-ID has not yet been registered in the STO stack and the thus formed STO-ID is transferred to the table look-aside buffer TLB after the corresponding data is registered in the STO stack and, at the same time, when the old STO-ID's having the same value as the newly formed STO-ID already have their data registered and the number of the old STO-ID's pieces of data is larger than that of the storage positions of the STO stack, at least one of the pieces of data corresponding to the old STO-ID's is erased. The STO stack control system includes a plurality of control registers for storing input data designating virtual spaces, the STO stack is retrieved depending upon the contents of the plurality of control registers that correspond to the plurality of virtual spaces, and when the contents of a given one of the control registers are changed and the data corresponding to the old STO-ID that is to be erased is the data corresponding to the old STO-ID that corresponds to a space other than the old space specified by the contents of the other control register, the corresponding data of said old STO-ID is not erased but, instead, the corresponding data of the old STO-ID corresponding to the old space is erased.

BRIEF DESCRIPTION OF THE DRAWINGS

FIG. 2 is a format diagram of a STO·ID used in the system of FIG. 1;

FIG. 3 is a format diagram of a control information CNT stored in a STO stack included in the system of FIG. 1; and FIG. 4 is a diagram of a process for determining the STO·ID that is to be erased by the erasure processing unit of FIG. 1.

DESCRIPTION OF THE PREFERRED EMBODIMENT

Figure 1:
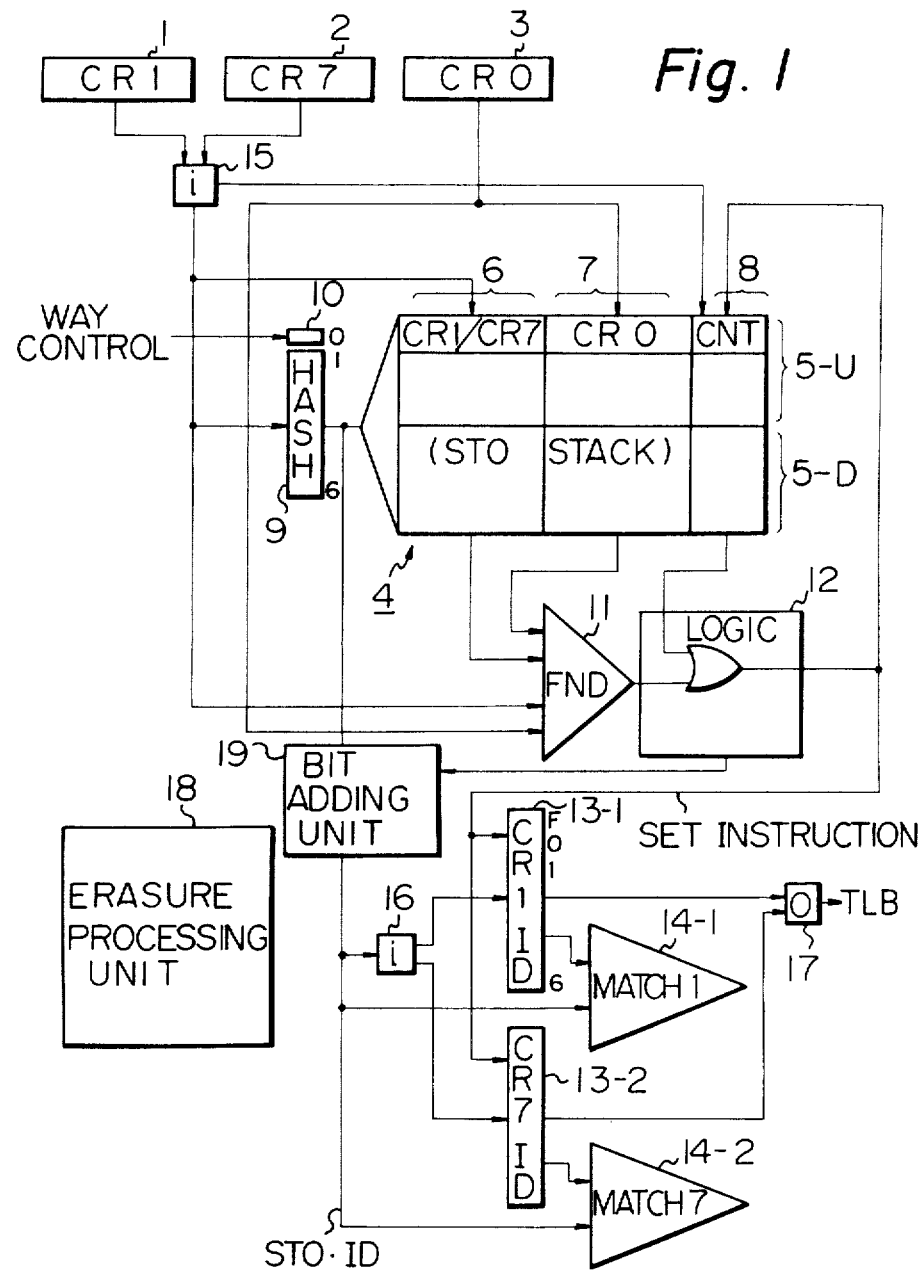
FIG. 1 is a block circuit diagram of a STO stack control system which is an embodiment of the present invention.

An embodiment of the present invention will be described with reference to the attached drawings. In FIG. 1, reference numeral 1 denotes a primary control register (CR1), 2 denotes a secondary control register (CR7), 3 denotes a number zero control register (CR0) which gives a page size or a segment size, 4 denotes a STO stack, 5-U denotes an upper portion of the STO stack, 5-D denotes a lower portion, 6 denotes a region for storing the content of the control registers 1 or 2, 7 denotes a region for storing the contents of the control register 3, 8 denotes a region for storing the control data CNT, 9 denotes a hashing unit, 10 denotes a portion instructing unit or selection unit, 11 denotes a found processing unit which discriminates whether or not the corresponding content is registered on the STO stack 4 when the contents of the control register 1 or 2 are changed, 12 denotes a logic circuit portion, 13-1 and 13-2 denote STO·ID set registers into which the STO··ID's converted by the STO stack 4 will be set, 14-1 and 14-2 denote matching units, 15 and 16 denote in-pointers (selectors), 17 denotes an out-pointer (selector), 18 denotes an erasure processing unit, and 19 denotes a bit adding unit.

The STO stack 4 stores the contents of to the control register 1 or 2 whose bit lengths are, for example, 18 bits, and which include the addresses for indicating virtual spaces, stores contents of the number zero control register 3, and stores the control data CNT, in a manner as mentioned below. That is, the contents of the control register 1 or 2 are selected by the in-pointer 15. The selected contents, the contents of the control register 3, and the control data CNT are stored in a location determined by the result that is obtained by hashing the contents of the selected control register using the hashing unit 9, and based on the portion selected by the way instructing unit 10. For example, both the upper portion 5-U and the lower portion 5-D have 64 locations or words and one of the locations is selected by the 6 bits hashed result obtained by hashing the contents of the control register 1 or 2 whose bit lengths are 18 bits. First, the way instructing unit 10 instructs that the data are to be stored in the upper portion 5-U. However, if other data has been stored in the corresponding location, the data is stored in the lower portion 5-D. If other data has already been stored both in the upper portion and in the lower portion, the erasure processing is carried out, which will be described later.

The result hashed by the hashing unit 9 corresponds to bits "1" to "6" of the STO·ID which consists of eight bits as shown in FIG 2. The bit adding unit 19 adds bits "F" and "0" of FIG. 2 to these 6 bits and constitutes the STO·ID. When the STO stack is full and the data correspondig to the old STO·ID is erased, the bit "F" is inverted. The bit "0" designates the storing position of the upper portion 5-U or the lower portion 5-D, and is used to distinguish the two STO·ID's from each other.

Bits "1" to "6" correspond to the result that is obtained by hashing the content of the control register 1 or 2.

On the STO stack 4, as mentioned above, STO·ID's have been registered that correspond to virtual spaces and that were once used in the computer system. In the diagramed example, the STO·ID's are registered in the STO stack 4 such that the contents of the control registers 1 or 2 and of the control register 3 are stored on the STO stack 4, and addresses of the locations of the stored contents corresponds to the STO·ID's.

Let it now be assumed that the contents of the control register 1 are changed by using, for example, a load control (LCTL) instruction in the above-mentioned system. In this case, contents of the control register 1 are selected by the in-pointer 15 which is controlled by instruction, and are hashed by the hashing unit 9 to first access, for example, the upper portion 5-U in the STO stack 4. Then, the found processing unit 11 discriminates whether the contents read from the upper portion 5-U of the STO stack 4 are in agreement with the contents of the control registers 1 and 3, i.e., whether or not the contents of the regions 6 and 7 are in agreement with the contents of the control registers 1 and 3. When the contents are in agreement, the output of the hashing unit 9 is passed in the form of bits "1" to "6" of the corresponding STO·ID, to the bit adding unit 19. The bits "F" and "O" are added in the bit adding unit 19 relying based upon the processing (mentioned later) of the logic circuit 12. Access is then made to the lower portion 5-D of the STO stack 4 irrespective of whether the contents read from the upper portion 5-U are in agreement with the contents of the control registers 1 and 3 at the time when the access to the STO stack is effected. When the contents of the control registers 1 and 3 are not in agreement with the upper portion 5-U or the lower portion 5-D, the found processing unit 11 sends a "not found" signal to the logic circuit 12.

When the found processing unit 11 outputs the "found" signal (when the data are in agreement), the logic circuit 12 instructs the bit adding unit 19 to add the bit "F" and the bit "O" to the output from the hashing unit 9, and further issues a set instruction to the STO·ID set register 13-1 so that the STO·ID which is generated by using the STO stack 4 is set into the register 13-1. The STO·ID set into the register 13-1 is then transferred to the table look-aside buffer TLB.

The same process is effected when the contents of the control register 2 are changed. When the "found" signal is issued from the found processing unit 11, the logic circuit 12 changes the hot/cold bit (H/C) in the control data CNT (FIG. 3) corresponding to the read data, which is in agreement, to a hot status, and changes the hot/cold bit in the control data corresponding to the read data, which is not in agreement to a cold status, and then rewrites the data onto the STO stack 4.

FIG. 3 shows a format of the control data CNT, in which the bit CR1/CR7 designates whether the data stored at this location corresponds to the control register 1 or to the control register 2. If the bit is "0", the data was generated on the basis of the control register 1, and if the bit is "1", the data was generated on the basis of the control register 2. The bit "V" designates whether the stored content is valid or invalid. The bit "H/C" shows whether the data is hot or cold. The bit "F" represents the fact that the STO stack is full under the condition that the portions are both valid. When the "not found" signal is issued, the bit "F" is inverted and is set into the STO stack 4 and into the STO-ID set register 13-1 or 13-2.

When the STO stack 4 is to be retrieved as a result of the change of contents of the control register 1 as mentioned above, the contents read from the upper portion 5-U and the contents read from the lower portion 5-D may both be valid, and the found processing unit 11 may issue the "not found" signal. In such a case, the data is newly registered stored relying upon the contents of the control register 1 at that time. That is, the contents of the control register 1 are newly written at a location in the STO stack 4, i.e., at a location whose address is provided by the output of the hashing unit 9. It need not be pointed out that the bit "H/C" in the control data CNT in the thus written contents is set to hot. If any other data is already stored in the location which is indicated by the output of the hashing unit 9 and which is located in either the upper portion 5-U or the lower portion 5-D, the bit "H/C" corresponding to the other data is set to be a cold status.

In newly writing data, if other register contents are already stored in both the upper portion 5-U and the lower portion 5-D, i.e., if the data stored has two old STO-ID's which have the same value (bits "1" to "6") as the STO-ID that is to be newly registered on the data stack, either one of the two pieces of data corresponding to the old STO-ID's can be erased from the STO stack 4. In this case, the logic circuit 12 sets the STO-ID into the STO-ID set register 13-1 if the bit CR1/CR7 designates the control register 1 and sets the STO-ID into the register 13-2 if the bit CR1/CR7 designates the control register 2, with reference to the content of the bit "CR1/CR7" on the side where the bit "H/C" is cold. In this case, the STO-ID which is generated for new registration is supplied to the matching units 14-1 and 14-2. When the STO-ID to be newly registered is generated due to the change in the content of the control register 2, the matching unit 14-1 examines whether or not the STO-ID is in agreement with the content of the register 13-1. When they are in agreement, the matching unit 14-1 produces a "forbid" signal. Further, when the STO-ID to be newly registered is generated due to the change in the contents of the control register 1, the matching unit 14-2 examines whether or not the STO-ID is in agreement with the content of the register 13-2. When they are in agreement, the matching unit 14-2 also produces a "forbid" signal.

As shown in FIG. 4, the erasure processing unit 18 of FIG. 1, (i) determines whether the erasure processing is effected responsive to the change of contents of the control register 1 or 2 (CR1 in FIG. 4 indicates that erasure is effected due to the change of contents of the control register 1), and (ii) determines whether or not the bit "CR1/CR7 FLAG" which is provided, for example, in the erasure processing unit 18, assumes the logic level "1". In this case, the logic level "1" is determined by the result that is hashed by the hashing unit 9 and by the result that is instructed by the portion instructing unit 10, and indicates that the bit "CR1/CR7" had been registered in the upper portion 5-U and in the lower portion 5-D in a way as described below.

|  | Bit CR1/CR7 | |
|---|---|---|
| Upper portion 5-U | 0 | 1 |
| Lower portion 5-D | 1 | 0 |

In other words, it indicates that the content of the control register 1 had been registered in either one of the portions and the contents of the control register 2 had been registered in the other portion. The erasure processing unit 18 further (iii) determines whether the STO-ID is to be erased depending upon the "forbid" signal produced by the matcing unit 14-1 or 14-2 when the logic level is "1".

When the "forbid" signal has not been issued, the erasure processing unit 18 indicates the erasure of the registration on the side where the bit "H/C" is cold, as shown in FIG. 4. When the "forbid" signal is issued due to the change of contents of the control register 1, the erasure processing unit 18 indicates the erasure of the registration on the side whose "CR1/CR7" bit designates the control register 1. When the "forbid" signal is issued due to the change of contents of the control register 2, the erasure processing unit 18 indicates the erasure of the registration on the side whoe "CR1/CR7" bit designates the control register 2. The erasure processing unit 18 can be constructed by using, for example, a simple memory means.

When the registration is erased in the STO stack 4 as mentioned above, the virtual space corresponding to the erased STO-ID need not be processed in the data processing system. At the same time, the correspondence data between the real address and the logic address stored in the TLB become invalid and are, hence, invalidated on the TLB.

Processing by the logic circuit 12 mentioned above is briefly summarized as follows:

(i) HOT/COLD control.

When the contents of the upper portion 5-U and the lower portion 5-D are read out, the bits "H/C" are renewed. Further, the cold side is extracted under the conditions that the STO stack is full and the "not found" signal is issued.

(ii) Flipper control.

In the case that STO stack is full and "not found" is issued, the bit "F" is inverted and is set into the STO-ID set register and into the STO stack.

(iii) Valid control.

Processing for determining whether the contents read from the STO stack is valid or invalid.

(iv) "CR1/CR7 FLAG" control.

Processing for setting the "CR1/CR7 FLAG" bit depending upon the contents of the "CR1/CR7" bits read from the upper portion 5-U and the lower portion 5-D.

According to the present invention as illustrated in the foregoing, registration on the cold side on the STO stack is not simply erased, but is erased depending upon whether the contents of the control register 1 or the control register 2 are changed, so that the registration is not undesirably changed. Moreover, in the system according to the present invention, it is possible to effect dynamic access over the virtual space designated by the contents of the control register 1 and the virtual space designated by the contents of the control register 2 in a manner as if these virtual spaces are included in one big virtual space. Therefore, the processing ability of a data processing system does not decrease even when dynamic access over two virtual spaces is effected.

We claim:

1. A segment table origin (STO) stack control system connected to a table look-aside buffer (TLB), comprising:

a STO stack divided into portions, that stores STO data based on STO identifies (STO·ID's) generated in dependence on the basis of hashed results of input data designating virtual spaces, and in which system said STO stack is retrieved when the input data is changed, the STO·ID generated by using said STO stack is transferred to the TLB when the STO data identified by the STO·ID has already been registered in the STO stack, a new STO·ID is formed when the STO data identified by the STO·ID has not yet been registered in the STO stack and the thus formed STO·ID is transferred to the TLB after the STO data is registered in the STO stack and, at the same time, when the old STO·ID's having the same value as the newly formed STO·ID already have the corresponding STO data registered and the number of the old STO·ID's is equal to the number of locations of the STO stack, at least one of the old STO·ID's is erased; and a plurality of control registers, operatively connected to said STO stack, for storing the input data designating virtual spaces, the STO stack is retrieved depending upon the contents of said plurality of control registers that correspond to a plurality of virtual spaces, and when the content of a given one of the control registers is changed and the STO data having the old STO·ID that is to be erased is the STO data generated in dependence upon the contents of the control register other than the given control register, if the STO data to be erased corresponds to the STO·ID presently used, the STO data corresponding thereto is not erased but, instead the STO data corresponding to the STO·ID not presently used is erased.

2. A STO stack control system according to claim 1, wherein said STO data are stored in the STO stack in a manner such that that the contents of each of the STO-·ID's correspond to the address of the location of the STO stack.

3. A STO stack control system according to claim 1 or 2, wherein said STO stack is divided into two portions.

4. A STO stack control system according to claim 3, wherein said STO stack has an upper portion and a lower portion.

5. A STO stack control system according to claim 2, wherein said STO stack comprises STO data storage areas including:
   a register area for storing the contents of one of said control registers; and
   a control data are for storing control data for each location thereof.

6. A STO stack control system according to claim 5, wherein said control data includes register data which designates the control register whose contents are stored in the location and use designation data which indicates whether the STO data stored in the location has been recently used or not.

7. A STO stack control system according to claim 6, wherein said control data further includes validity data which indicates whether the STO data stored in the location is valid or invalid.

8. A STO stack control system according to claim 5, 6, or 7, wherein said system further comprises a logic circuit portion, operatively connected to said STO stack and said control registers, which renews said control data.

9. A STO stack control system according to claim 1, wherein said system further comprises a found processing unit, operatively connected to said STO stack and said control registers, for discriminating whether the contents of one of the control registers are registered on the STO stack when the contents of the one of the control registers are changed.

10. A STO stack control system according to claim 1, wherein said system further comprises an erasure processing unit for determining which of the STO data which is erased.

11. A STO stack control system according to claim 10, wherein said erasure processing unit invalidates data in the TLB corresponding to the erased STO data.

12. A STO stack control system according to claim 1, wherein said system further comprises:
   a plurality of STO·ID set registers, operatively connected to said STO stack and said control registers, each corresponding to one of the control registers; and
   a plurality of matching units, operatively connected to said STO·ID registers and said control registers, which compare the contents of said STO·ID set registers with the STO·ID newly produced when the contents of the control register are changed.

13. A STO stack control system according to claim 1, wherein said system further comprises a bit adding unit, operatively connected to said control registers and said STO stack, which adds a flipper bit and a bit 0 to the hashed results of the input data designating virtual spaces, thereby forming an STO·ID.

14. A segment table origin (STO) control system, comprising:
   first and second control register means for storing control register data;
   STO stack means, operatively connected to said first and second control register means, for generating an STO·ID from the control register data and for storing STO data, generated from the control register data, in dependence upon the STO·ID; and
   control means, operatively connected to said first control register means, said second control register means and said STO stack means, for determining which STO data should be erased in dependence upon whether the STO data is old, which of said first and second control registers has had its contents changed, whether the STO·ID of the changed contents matches the STO·ID of the STO data stored in the STO stack and which control register data is stored in this location.

* * * * *

UNITED STATES PATENT AND TRADEMARK OFFICE
CERTIFICATE OF CORRECTION

PATENT NO. : 4,490,787

DATED : December 25, 1984

INVENTOR(S) : Masayuki Ohya and Masaaki Inou

It is certified that error appears in the above-identified patent and that said Letters Patent is hereby corrected as shown below:

Col. 1, line 20, delete "is".

Col. 3, line 36, delete "to".

Col. 6, line 7, change "matcing" to --matching--.

Col. 7, line 38, delete "that" (second occurrence).

Signed and Sealed this

Seventeenth Day of November, 1987

Attest:

Attesting Officer

DONALD J. QUIGG

Commissioner of Patents and Trademarks